US012669077B2

(12) United States Patent
Hesselmann

(10) Patent No.: US 12,669,077 B2
(45) Date of Patent: Jun. 30, 2026

(54) MOTOR VEHICLE HAVING AN INTERNAL COMBUSTION ENGINE AND HAVING AN EXHAUST-GAS AFTERTREATMENT DEVICE, EXHAUST-GAS AFTERTREATMENT DEVICE FOR AN INTERNAL COMBUSTION ENGINE, AND PARTICLE FILTER

(71) Applicant: Bayerische Motoren Werke Aktiengesellschaft, Munich (DE)

(72) Inventor: Christoph Hesselmann, Vogtareuth (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/847,573

(22) PCT Filed: May 25, 2023

(86) PCT No.: PCT/EP2023/064048
§ 371 (c)(1),
(2) Date: Sep. 16, 2024

(87) PCT Pub. No.: WO2023/247136
PCT Pub. Date: Dec. 28, 2023

(65) Prior Publication Data
US 2025/0207519 A1      Jun. 26, 2025

(30) Foreign Application Priority Data
Jun. 21, 2022      (DE) ..................... 10 2022 115 395.9

(51) Int. Cl.
*F01N 3/035*      (2006.01)
*B01D 46/58*      (2022.01)

(52) U.S. Cl.
CPC ............. *F01N 3/035* (2013.01); *B01D 46/58* (2022.01); *B01D 2271/02* (2013.01); *B01D 2279/30* (2013.01); *F01N 2510/06* (2013.01)

(58) Field of Classification Search
CPC .................................. F01N 3/035; F01N 3/28
See application file for complete search history.

(56) References Cited

U.S. PATENT DOCUMENTS

2004/0055265 A1      3/2004   Ohno et al.
2006/0021507 A1      2/2006   Costura et al.
(Continued)

FOREIGN PATENT DOCUMENTS

DE            600 32 391 T2      10/2007
DE      10 2015 111 634 A1       2/2016
(Continued)

OTHER PUBLICATIONS

International Search Report (PCT/ISA/210) issued in PCT Application No. PCT/EP2023/064048 dated Jul. 10, 2023 with English translation (4 pages).

(Continued)

*Primary Examiner* — Ngoc T Nguyen
(74) *Attorney, Agent, or Firm* — Crowell & Moring LLP

(57)      ABSTRACT

A particle filter includes a particle filter housing and a filter body arrangement which is accommodated in the particle filter housing and is configured to separate particles out of an exhaust-gas flow that is emitted by an internal combustion engine and passes through the filter body arrangement when the latter is used as intended. The filter body arrangement has filter body elements that are separated from one another by at least one liquid-tight layer that is oriented at least substantially in the direction of longitudinal extension of the (Continued)

particle filter. Further aspects relate to an exhaust-gas after-treatment device for an internal combustion engine, and to a motor vehicle.

17 Claims, 1 Drawing Sheet

(56)                    References Cited

U.S. PATENT DOCUMENTS

2010/0037600 A1    2/2010  Doering
2016/0040579 A1    2/2016  Solbrig et al.

FOREIGN PATENT DOCUMENTS

DE      10 2018 216 841  A1    4/2020
EP              2 154 343  B1    7/2016
WO      WO 2010/070100  A1    6/2010

OTHER PUBLICATIONS

German-language Written Opinion (PCT/ISA/237) issued in PCT Application No. PCT/EP2023/064048 dated Jul. 10, 2023 with English translation (8 pages).
German-language Search Report issued in German Application No. 10 2022 115 395.9 dated Oct. 27, 2022 with partial English translation (12 pages).

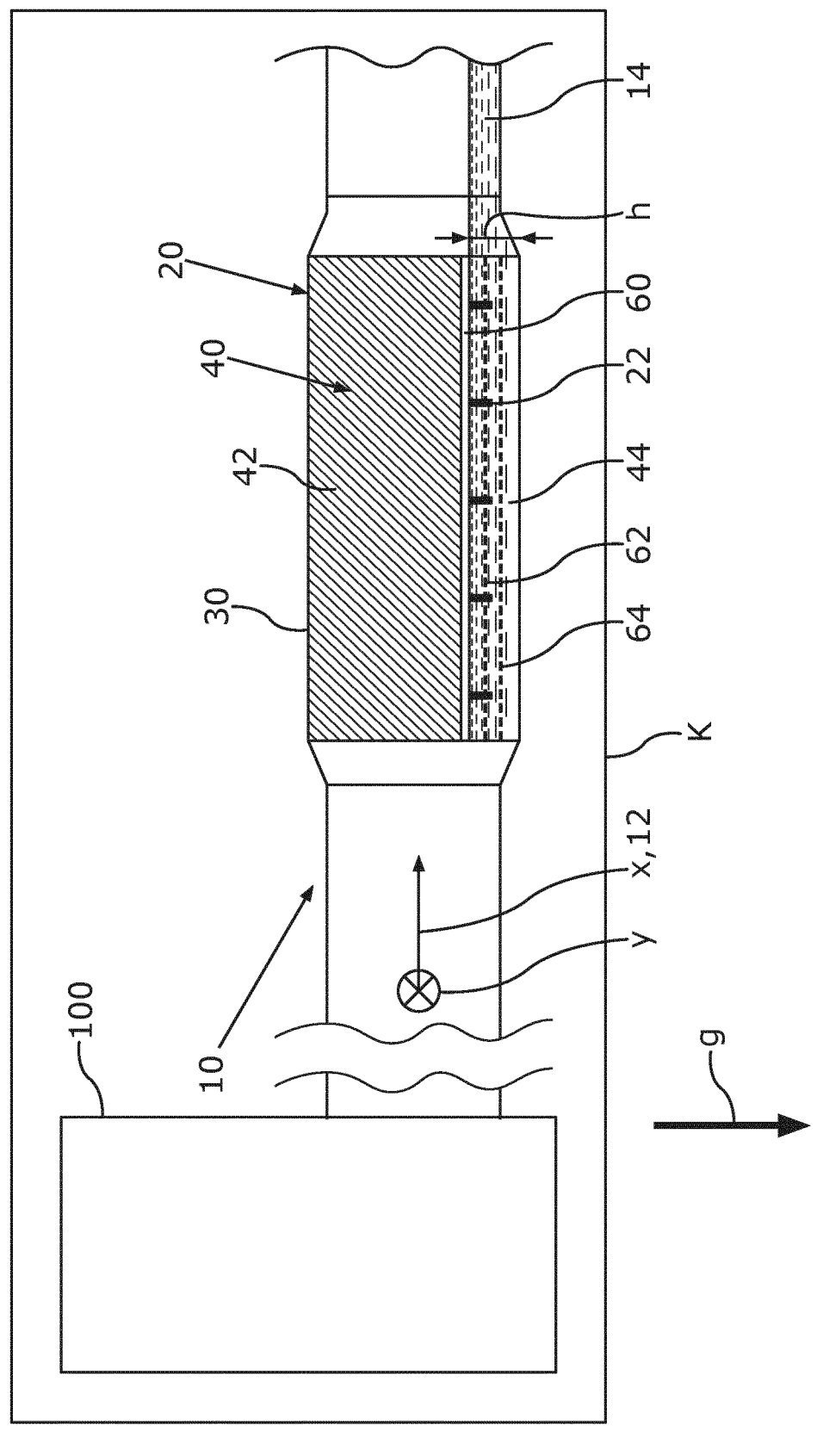

MOTOR VEHICLE HAVING AN INTERNAL COMBUSTION ENGINE AND HAVING AN EXHAUST-GAS AFTERTREATMENT DEVICE, EXHAUST-GAS AFTERTREATMENT DEVICE FOR AN INTERNAL COMBUSTION ENGINE, AND PARTICLE FILTER

BACKGROUND AND SUMMARY

The invention relates to a motor vehicle having an internal combustion engine and having an exhaust-gas aftertreatment device which a particle filter having a particle filter housing and having a filter body arrangement which is designed to separate particles from an exhaust-gas flow, which can be emitted by the internal combustion engine and flows through the filter body arrangement during the intended use thereof, and is received in the particle filter housing. Further aspects of the invention relate to an exhaust-gas aftertreatment device for an internal combustion engine and to a particle filter.

While diesel particle filters have been used for some time for the exhaust-gas aftertreatment of diesel engines, use is also now increasingly being made of Otto particle filters. This is being done in the context of ever stricter emission standards and in order to even further reduce the proportion of already low amounts of soot particles, compared with the diesel engine, in the exhaust gas produced by gasoline engines. An Otto particle filter (OPF) can, for example, comprise a porous ceramic stone (ceramic stone), the porous surface of which can ensure that soot particles are reliably filtered out of the exhaust gas and thus the current emission legislation is met worldwide. As the respective legislation becomes tougher, the demands on the filtration efficiency (FE) of a particle filter increase. This can be tackled at the component level of the particle filter by ever-finer porous structures on the ceramic stone.

DE 10 2018 216 841 A1 discloses a filter for filtering an exhaust gas of a combustion engine, having an inflow side and an outflow side. The filter is formed from a plurality of nonwoven layers which each have, at the end on the inflow side and the outflow side, a gas-impermeable end region formed by a smooth strip. The nonwoven layers have, at least on one side, a corrugated layer strip which is arranged along the smooth strip. Two nonwoven layers which are adjacent to one another are spaced apart from one another on the inflow side or the outflow side. Two smooth strips which are directly adjacent to one another are gas-tightly connected to one another alternately on the inflow side and the outflow side.

It is an object of the present invention to provide a motor vehicle having an internal combustion engine, in which a failure-resistant and effective exhaust-gas aftertreatment can be carried out. It is also an object of the invention to provide a corresponding exhaust-gas aftertreatment device for an internal combustion engine and a particle filter.

This object is achieved by a motor vehicle having the features disclosed herein, by an exhaust-gas aftertreatment device having the features disclosed herein, and by a particle filter according to the present disclosure. Advantageous embodiments with expedient developments of the invention are also specified in the present disclosure.

A first aspect of the invention relates to a motor vehicle having an internal combustion engine and having an exhaust-gas aftertreatment device which a particle filter having a particle filter housing and having a filter body arrangement which is designed to separate particles from an exhaust-gas flow, which can be emitted by the internal combustion engine and flows through the filter body arrangement during the intended use thereof, and is received in the particle filter housing. The filter body arrangement can thus be used overall, during the intended use thereof, in particular during exhaust-gas aftertreatment using the filter body arrangement, to filter particles out of the exhaust-gas flow passing through the filter body arrangement during operation of the internal combustion engine.

Provision is made according to the invention for the filter body arrangement to comprise filter body elements which are separated from one another by at least one liquid-tight, in particular water-tight, layer oriented at least substantially in a longitudinal extent direction of the particle filter. This is advantageous since the liquid-tight layer, which can also be referred to as separating layer, prevents the filter body arrangement as a whole from becoming undesirably saturated with liquid, in particular water, if liquid is located in the exhaust-gas aftertreatment device and comes into contact with the filter body arrangement. The undesired saturation can lead to an impermissibly high exhaust-gas counterpressure when the filter body arrangement is being flowed through with the exhaust-gas flow, as a result of which disruptions during operation of the internal combustion engine may occur. In addition to the longitudinal extent direction, the filter body elements can also be completely separated from one another in a transverse extent direction by virtue of the at least one liquid-tight layer preferably extending between two mutually opposite housing regions of the particle filter housing and being connected to these mutually opposite housing regions. The layer can in particular be oriented parallel to a plane spanned by the longitudinal extent direction and transverse extent direction of the particle filter. The longitudinal extent direction can preferably correspond to a flow direction of the exhaust-gas flow. In the flow direction, the exhaust-gas flow can pass through the filter body elements during the intended use of the particle filter.

The invention is based on the finding that the filter body elements, which are usually formed from a ceramic material, have fine structures, in particular pores, which make it possible to filter the particles out of the exhaust-gas flow but also promote possible saturation of one of the filter body elements, in particular due to a capillary effect, by which liquid can also be conveyed through the filter body element counter to the direction of action of gravity. In the case of a sufficiently large amount of liquid, in particular water, coming into contact with the filter body element, saturation of the entire filter body element may occur in the worst case. If the particle filter comprises a single, continuous filter body element, complete soaking of the filter body arrangement may occur. Water as liquid is a by-product of the combustion of a fuel/air mixture during fired operation of the internal combustion engine. Particularly during prolonged operation of the internal combustion engine at low load points, relatively large amounts of water can accumulate in the exhaust-gas aftertreatment device. In addition to the formation of water as by-product as a result of the combustion, water can additionally also enter the exhaust-gas aftertreatment device of the motor vehicle from the environment. This may be the case, for example, during heavy rain or when driving through a car wash. It is thus possible in the worst case for several liters of water as liquid to accumulate for example in a rear silencer of the exhaust-gas aftertreatment device and other geodetically low-lying locations of the exhaust-gas aftertreatment device, and this liquid can then slosh around as far as the particle filter as a result of driving operation of the motor vehicle, that is to say due to driving-dynamics-related movements. On account of the porous structure of the filter body element, the latter can potentially be saturated completely with water, even if only a lower part of the filter body element in the direction of action of gravity is in water. The risk of saturation is present particularly when the particle filter is used as underbody particle filter. A water-soaked filter body element, which—if the particle filter is in the form of an Otto particle filter—can also be referred to as OPF stone, has multiple serious disadvantages. Soaked with liquid water, the exhaust-gas counterpressure during operation of the internal combustion engine is increased considerably by way of the saturated filter body element, as a result of which apparent faults can occur in various diagnostic analyses regarding the particle filter during operation of the internal combustion engine. At temperatures below freezing, that is to say below 0° C., freezing of the water contained in the filter body element and consequently a considerable increase in the exhaust-gas counterpressure can occur, possibly leading to complete blockage of the exhaust-gas after-treatment device. This results in a breakdown of the motor vehicle. In this case, the particle filter can also be damaged by the extreme exhaust-gas counterpressure. The invention addresses this, with the liquid-tight layer being able to prevent saturation of all the filter body elements, with the result that the saturation of at least one of the filter body elements can be prevented by the layer and the functionality of the exhaust-gas aftertreatment device can be ensured even when liquid is present in the exhaust-gas aftertreatment device and at temperatures below freezing. This makes it possible to carry out failure-resistant and effective exhaust-gas aftertreatment even in the case of such adverse conditions.

In an advantageous development of the invention, the at least one liquid-tight layer is oriented at least substantially perpendicular to the direction of action of gravity. This is advantageous because the layer therefore prevents liquid columns, in particular water columns, produced in the exhaust-gas aftertreatment device from undesirably entering all the filter body elements, without the layer taking up an unnecessarily large amount of installation space within the particle filter housing. The at least one layer can be assigned to the filter body arrangement and thus also be a layer of the particle filter. In the context of the present disclosure, the expression "oriented at least substantially perpendicular to the direction of action of gravity" should be understood to mean that the at least one layer can preferably lie in a plane, the normal vector of which can be oriented parallel to the direction of action of gravity. However, in the context of the disclosure, the expression "oriented at least substantially perpendicular to the direction of action of gravity" can also be understood to mean that the normal vector and the direction of action of gravity enclose an angle $\alpha$, a being able to correspond for example to one of the angle values 1°, 2°, 3°, 4°, 5°, 6°, 7°, 8°, 9° or 10°.

In a further advantageous development of the invention, the filter body arrangement comprises a plurality of filter body elements, of which in each case two of the filter body elements are separated from one another by at least one likewise liquid-tight additional layer oriented parallel to the at least one liquid-tight layer. This advantageously makes it possible that, in the case of a low liquid level in the exhaust-gas aftertreatment device, also only a small volume of the filter body arrangement is saturated with the liquid.

The following example is intended to serve as an illustration:

if the particle filter comprises, for example, two additional layers, these two additional layers together with the layer collectively liquid-tightly separate four filter body elements of the filter body arrangement from one another. In the direction of action of gravity, the following order may then be provided: first filter body element-liquid-tight layer-second filter body element-first additional layer-third filter body element-second additional layer-fourth filter body element.

If, in relation to this example, the second additional layer is for example located geodetically above the liquid level, it is also the case that only the geodetically lowest of the four filter body elements, in this example the fourth filter body element, is saturated, whereas saturation of the three filter body elements (first, second and third filter body element) arranged geodetically above the fourth filter body element can be effectively avoided. Overall, the liquid-tight layer and the additional layers can thus form multiple separating layers for different liquid levels.

In a further advantageous development of the invention, the at least one liquid-tight layer and the filter body elements are formed from materials which differ from one another. This facilitates, for example, a liquid-tight connection between the particle filter housing and the liquid-tight layer. The layer and the particle filter housing can, for example, be formed from the same metallic material and be connected to one another, for example, in a materially bonded manner.

In a further advantageous development of the invention, the at least one liquid-tight layer is formed from a material having a greater thermal conductivity than the material of the filter body elements. This promotes a rapid distribution of heat along the filter body arrangement, as a result of which thermal stresses can be reduced.

In a further advantageous development of the invention, the material of the at least one liquid-tight layer is metallic. Advantageously, this makes it possible to more rapidly distribute heat within the particle filter housing and along the filter body elements. In other words, the liquid-tight layer can therefore be formed from a metallic material, which can contribute to better heating of the particle filter during operation of the internal combustion engine through heat conduction along the layer.

In a further advantageous development of the invention, the particle filter comprises at least one projection which is connected to the liquid-tight layer and is introduced into at least one of the filter body elements in the direction of action of gravity. This optional embodiment allows a more rapid transfer of heat from the layer to at least one filter body element, which lies at a geodetically lower level than the liquid-tight layer, of the filter body arrangement. In other words, the at least one projection can be introduced downward in the direction of gravity into one of the filter body elements. The at least one projection can, for example, be connected in one part with the liquid-tight layer. This may be advantageous for, at ambient temperatures below the freezing point of water, accelerating any defrosting of the water-saturated and frozen filter body element, arranged at a geodetically lower level than the liquid-tight layer, as soon as the internal combustion engine is operated in fired mode, that is to say with combustion of a fuel/air mixture. It is for example conceivable for the at least one projection to be able to be in the form of a rib, which can be oriented in the longitudinal extent direction, preferably in the flow direction of the exhaust-gas flow.

In a further advantageous development of the invention, the at least one liquid-tight layer and the filter body elements are formed from the same material and the at least one liquid-tight layer has a lower porosity and/or a higher density than the filter body elements. What is advantageous here is that the liquid-tight layer and the filter body elements can thus have an at least similar thermal conductivity, as a result of which any undesirably high thermal stresses between the layer and the filter body elements can be avoided during the operation-related heating of the particle filter. In order to make the layer liquid-tight, the layer can be compacted more strongly and additionally or alternatively have fewer pores than the filter body elements.

A second aspect of the invention relates to an exhaust-gas aftertreatment device comprising at least one particle filter according to the first aspect of the invention. In this exhaust-gas aftertreatment device, a particularly failure-resistant and effective exhaust-gas aftertreatment can be carried out.

A third aspect of the invention relates to a particle filter for a motor vehicle according to the first aspect of the invention and/or for an exhaust-gas aftertreatment device according to the second aspect of the invention. By this particle filter, an exhaust-gas aftertreatment can be carried out in a failure-resistant and effective manner even in the case of any ingress of liquid into the particle filter.

The preferred embodiments, and the advantages thereof, presented with regard to one of the aspects apply correspondingly to the respective other aspects of the invention, and vice versa.

The features and feature combinations mentioned above in the description, and the features and feature combinations mentioned below in the description of the figures and/or only shown in the FIGURES, may be used not only in the respectively specified combination but also in other combinations or individually without departing from the scope of the invention.

Further advantages, features and details of the invention will emerge from the claims, from the following description of preferred embodiments and from the drawings.

The invention will be discussed once again below on the basis of a specific exemplary embodiment.

BRIEF DESCRIPTION OF THE DRAWING

FIG. 1 shows a schematic illustration of a motor vehicle having an internal combustion engine which emits an exhaust-gas flow which is conducted through an exhaust-gas aftertreatment device whose particle filter comprises at least one liquid-tight layer which separates various filter body elements of a filter body arrangement of the particle filter from one another.

DETAILED DESCRIPTION OF THE DRAWING

FIG. 1 shows a motor vehicle K having an internal combustion engine 100 and having an exhaust-gas aftertreatment device 10 which comprises a particle filter 20. In addition to the particle filter 20, the exhaust-gas aftertreatment device 10 can also comprise further exhaust-gas aftertreatment units, for example at least one catalytic converter which can be connected upstream or downstream of the particle filter. In the present case, no further exhaust-gas aftertreatment units, such as the catalytic converter, are shown apart from the particle filter 20.

The particle filter 20 has a particle filter housing 30 and a filter body arrangement 40. The filter body arrangement 40 is received in the particle filter housing 30 and serves to separate particles from an exhaust-gas flow 12 which can be emitted by the internal combustion engine 100 and flows through the filter body arrangement 40 during the intended use thereof. In the present case, the exhaust-gas flow 12 is illustrated by way of example by an arrow oriented in the longitudinal extent direction x of the particle filter 20. For this reason, the arrow illustrating the exhaust-gas flow 12 also represents this longitudinal extent direction x. A transverse extent direction y of the particle filter 20 runs perpendicular to the plane of the drawing and thus perpendicular to the longitudinal extent direction x.

The filter body arrangement 40 may comprise multiple filter body elements, of which by way of example a first filter body element 42 and a second filter body element 44 are shown. It can be seen from FIG. 1 that the two filter body elements 42, 44 are separated from one another by a liquid-tight, in particular water-tight, layer 60 oriented in the longitudinal extent direction x of the particle filter 20. The liquid-tight layer 60 oriented perpendicular to the direction of action g of gravity thus separates the first filter body element 42 and the second filter body element 44 completely both in the longitudinal extent direction x and in the transverse extent direction y.

The filter body arrangement 40 may comprise a plurality of filter body elements 42, 44, of which in each case two of the filter body elements 42, 44 are separated from one another by at least one likewise liquid-tight additional layer 62, 64 oriented parallel to the at least one liquid-tight layer 60. FIG. 1 indicates, by dashed lines, the first additional layer 62 and the second additional layer 64. The water-tight layer 60 and the likewise water-tight additional layers 62, 64 each form a separating layer for different liquid levels h of a liquid 14 (here: water).

The liquid-tight layer 60 and the additional layers 62, 64 may be formed from a material having a greater thermal conductivity than the material of the filter body elements 42, 44. Accordingly, the liquid-tight layer 60, the additional layers 62, 64 and the filter body elements 42, 44 may be formed from a ceramic material and be designed in particular as ceramic stone. The liquid-tight layer 60 and the additional layers 62, 64 may have a lower porosity and additionally or alternatively a higher density than the filter body elements 42, 44.

As an alternative thereto, the material of the liquid-tight layer 60 and of the additional layers 62, 64 may also be metallic, as a result of which improved thermal conductivity within the liquid-tight layer 60 and the additional layers 62, 64 is achieved. In an optional embodiment, it is conceivable for the particle filter 20 to comprise multiple projections 22 which is, for example, connected to the liquid-tight layer 60 and introduced into at least one of the filter body elements 42, 44 in the direction of action g of gravity.

In summary, the present disclosure tackles the problem that a water-soaked ceramic stone of a particle filter has multiple serious disadvantages. Soaked with liquid water, the exhaust-gas counterpressure during operation of the internal combustion engine is increased considerably, as a result of which apparent faults can occur in various diagnostic analyses of the particle filter. At temperatures below the freezing point of water, that is to say below 0° C., and therefore with frozen water contained in the particle filter, the exhaust-gas counterpressure once again increases tremendously, until in the worst case complete blockage of the exhaust-gas aftertreatment device can occur. This can result in a breakdown of the motor vehicle. In this case, the particle filter can also be damaged by the extreme counterpressure.

As a result of the liquid-tight layer which acts as separating layer, at least a part of the filter body arrangement, for example at least one of the ceramic stones (filter body elements), is no longer saturated with water, but rather only another ceramic stone of the filter body arrangement that is standing in water. As a result, the particle filter is no longer completely affected by the above-described negative effects of the water. Although the saturated part may still freeze, this can be compensated for by the much larger dry region of the stone, as a result of which breakdowns and deterioration of the emissions are avoided.

LIST OF REFERENCE DESIGNATIONS

10 Exhaust-gas aftertreatment device
12 Exhaust-gas flow
14 Liquid
20 Particle filter
22 Projection
30 Particle filter housing
40 Filter body arrangement
42 Filter body element
44 Filter body element
60 Layer
62 First additional layer
64 Second additional layer
100 Internal combustion engine
g Direction of action
h Liquid level
K Motor vehicle
x Longitudinal extent direction
y Transverse extent direction

What is claimed is:
1. A motor vehicle comprising:
an internal combustion engine; and
an exhaust-gas aftertreatment device comprising a particle filter having a particle filter housing and having a filter body arrangement configured to separate particles from an exhaust-gas flow that is emitted by the internal combustion engine and flows through the filter body arrangement and is received in the particle filter housing,
wherein the filter body arrangement comprises filter body elements that are separated from one another by at least one liquid-tight layer oriented at least substantially in a longitudinal extent direction of the particle filter, wherein the at least one liquid-tight layer extends between and is sealingly connected to opposite regions of the particle filter housing so as to completely separate, in the longitudinal extent direction and a transverse extent direction, filter body elements located geodetically above the at least one liquid-tight layer from filter body elements located geodetically below the at least one liquid-tight layer, and
wherein the at least one liquid-tight layer is configured to form a separating layer for at least one level of a liquid.
2. The motor vehicle according to claim 1,
wherein the at least one liquid-tight layer is oriented at least substantially perpendicular to a direction of action of gravity.
3. The motor vehicle according to claim 1,
wherein the filter body arrangement comprises a plurality of filter body elements, of which in each case two of the filter body elements are separated from one another by at least one liquid-tight additional layer oriented parallel to the at least one liquid-tight layer.
4. The motor vehicle according to claim 1,
wherein the at least one liquid-tight layer and the filter body elements are formed from materials which differ from one another.

5. The motor vehicle according to claim 4,
wherein the material of the at least one liquid-tight layer is metallic.
6. The motor vehicle according to claim 4,
wherein the particle filter comprises at least one projection that is connected to the liquid-tight layer and is introduced into at least one of the filter body elements in a direction of action of gravity.
7. The motor vehicle according to claim 1,
wherein the at least one liquid-tight layer is formed from a material having a greater thermal conductivity than a material of the filter body elements.
8. The motor vehicle according to claim 1,
wherein the at least one liquid-tight layer and the filter body elements are formed from a same material, and the at least one liquid-tight layer has a lower porosity and/or a higher density than the filter body elements.
9. A particle filter for a motor vehicle comprising:
a particle filter housing; and
a filter body arrangement configured to separate particles from an exhaust-gas flow that is emitted by an internal combustion engine of the motor vehicle and flows through the filter body arrangement and is received in the particle filter housing,
wherein the filter body arrangement comprises filter body elements that are separated from one another by at least one liquid-tight layer oriented at least substantially in a longitudinal extent direction of the particle filter, wherein the at least one liquid-tight layer extends between and is sealingly connected to opposite regions of the particle filter housing so as to completely separate, in the longitudinal extent direction and a transverse extent direction, filter body elements located geodetically above the at least one liquid-tight layer from filter body elements located geodetically below the at least one liquid-tight layer, and
wherein the at least one liquid-tight layer is configured to form a separating layer for at least one level of a liquid.
10. The particle filter according to claim 9,
wherein the at least one liquid-tight layer is oriented at least substantially perpendicular to a direction of action of gravity.
11. The particle filter according to claim 9,
wherein the filter body arrangement comprises a plurality of filter body elements, of which in each case two of the filter body elements are separated from one another by at least one liquid-tight additional layer oriented parallel to the at least one liquid-tight layer.
12. The particle filter according to claim 9,
wherein the at least one liquid-tight layer and the filter body elements are formed from materials which differ from one another.
13. Particle filter according to claim 12,
wherein the material of the at least one liquid-tight layer is metallic.
14. The particle filter according to claim 12,
wherein the particle filter comprises at least one projection that is connected to the liquid-tight layer and is introduced into at least one of the filter body elements in a direction of action of gravity.
15. The particle filter according to claim 9,
wherein the at least one liquid-tight layer is formed from a material having a greater thermal conductivity than a material of the filter body elements.
16. The particle filter according to claim 9,
wherein the at least one liquid-tight layer and the filter body elements are formed from a same material, and the at least one liquid-tight layer has a lower porosity and/or a higher density than the filter body elements.

17. An exhaust-gas aftertreatment device for an internal combustion engine, comprising:

the particle filter according to claim 9.

* * * * *